(12) United States Patent
Smiley et al.

(10) Patent No.: US 9,252,914 B2
(45) Date of Patent: Feb. 2, 2016

(54) ASSEMBLY AND METHOD FOR PREVENTING WIRELESS COMMUNICATION WHILE DRIVING

(76) Inventors: Scott D. Smiley, Wilton Manors, FL (US); Frank A. Vassallo, Micco, FL (US); Stephen R. Hershman, Melbourne Beach, FL (US)

( * ) Notice: Subject to any disclaimer, the term of this patent is extended or adjusted under 35 U.S.C. 154(b) by 123 days.

(21) Appl. No.: 13/990,124

(22) PCT Filed: Nov. 29, 2011

(86) PCT No.: PCT/US2011/062427
§ 371 (c)(1),
(2), (4) Date: May 29, 2013

(87) PCT Pub. No.: WO2012/075029
PCT Pub. Date: Jun. 7, 2012

(65) Prior Publication Data
US 2013/0303075 A1   Nov. 14, 2013

Related U.S. Application Data

(60) Provisional application No. 61/417,769, filed on Nov. 29, 2010.

(51) Int. Cl.
*H04K 3/00* (2006.01)
*H04B 1/034* (2006.01)

(52) U.S. Cl.
CPC ............... *H04K 3/415* (2013.01); *H04B 1/034* (2013.01); *H04K 2203/22* (2013.01)

(58) Field of Classification Search
CPC ... H04B 1/034; H04K 2203/22; H04K 3/415; H04K 3/42; H04K 3/45; H04K 2203/16; H04K 3/43; H04K 3/41; Y02T 10/7088; Y02T 10/7077; Y02T 90/127; Y02T 90/163; B60L 11/1818; B60L 2270/34; B60L 11/185; B60L 11/007; B60L 1/04
See application file for complete search history.

(56) References Cited

U.S. PATENT DOCUMENTS

| | | | |
|---|---|---|---|
| 2008/0191551 A1* | 8/2008 | Belanger et al. | 307/10.1 |
| 2009/0215387 A1* | 8/2009 | Brennan et al. | 455/1 |
| 2010/0041265 A1* | 2/2010 | Wang | 439/353 |

* cited by examiner

*Primary Examiner* — Golam Sorowar
(74) *Attorney, Agent, or Firm* — The Concept Law Group, P.A.; Scott D. Smiley

(57) ABSTRACT

A mobile-communication signal-jamming assembly includes a first portion shaped to fit within a power port of a vehicle and a second portion that at least partially extends from the power port. The assembly includes at least one engagement member that has a retracted position and an extended position that extends outwardly from the first portion and places the engagement member in a coupling arrangement with a portion of the power port of the vehicle. The assembly also includes a locking mechanism operable to selectively move the at least one engagement member from the retracted position to the extended position and a transmitter operable to broadcast radio frequency signals that interfere with at least one of a wireless transmission mode and a wireless reception mode of a mobile communication device proximate to the mobile-communication signal-jamming assembly.

16 Claims, 7 Drawing Sheets

ASSEMBLY AND METHOD FOR PREVENTING WIRELESS COMMUNICATION WHILE DRIVING

FIELD OF THE INVENTION

The present invention relates generally to preventing wireless communication while driving and more particularly relates to a wireless-communication signal-jamming device that can be temporarily physically secured within an automobile, thereby preventing a driver from removing or disabling the device.

BACKGROUND OF THE INVENTION

Modern mobile communication devices, such as cellular telephones media players with wireless connections, and other, have provided users with a robust line of applications and abilities. For example, virtually every cellular telephone now provides text messaging capabilities, internet connections, and virtual stores for downloading games and applications, just to name a few.

Utilization of virtually every feature on these devices requires significant time looking at the screen. It is undeniable that the use of these devices, while driving, is distracting to the driver and dangerous to both the driver and those around him or her. For this reason, many states have passed laws banning activities such as texting while driving. Although these laws are in place and most people know the dangerous, texting while driving, surfing the Internet, and other distracting activities are still engaged in by drivers on a regular basis.

One group that is notorious for being distracted while driving are teenagers. With the added component of the above-mentioned mobile devices, many parents are more fearful than ever of allowing their children to drive. One way to ensure children will not, for example, text and drive, is to require them to leave their cellular telephones at home. However, this puts the children in a dangerous situation of not having communicative capabilities. Although, in recent years, there was a time when most drivers did not have cellular telephone capability, they at least had the ability to pull over and utilize a pay telephone. Now, because cellular telephones have become so popular, pay phones have become virtually extinct. In addition, parents cannot prevent their children from using a passenger's mobile device while they drive.

One way to prevent communication, including text and voice, is through use of a wireless signal jammer. Generally, the objective of a wireless signal jammer is to interrupt the availability of the signal in the space of the receiver. They are devices that interfere with radio signals, i.e., any time-varying or spatial-varying quantity. As with other radio jamming, cell phone jammers block cell phone use by sending out radio waves along the same frequencies that cellular phones use. This causes enough interference with the communication between cell phones and towers to render the phones unusable. On most retail phones, the network would simply appear out of range. Most cell phones use different bands to send and receive communications from towers (called frequency division duplexing, FDD). Jammers can work by either disrupting phone-to-tower frequencies or tower-to-phone frequencies. Known handheld models block all bands from 800 MHz to 1900 MHz within about a 30-foot range (9 meters). The radius of cell phone jammers can range from a dozen feet for pocket models to kilometers for more dedicated units.

Currently-available jammers, such as the double and triple band jammers, can block all widely used systems (CDMA, iDEN, GSM, et al.) and are even very effective against newer phones which hop to different frequencies and systems when interfered with. As the dominant network technology and frequencies used for mobile phones vary worldwide, some work only in specific regions such as Europe or North America.

One possible way of preventing mobile communication while in a vehicle is to operate a mobile phone jammer within or on the vehicle, thereby blocking functionality of the driver's mobile device. However, if a jammer is merely placed inside the automobile, the driver could easily remove or disable the device. In addition, if the jammer is not powered by the vehicle, its operation will have to depend on batteries—a power supply that is not always dependable. Permanently installing the jammer, i.e., bolting and/or hardwiring it into the vehicle, requires tools and the aptitude to do so. With most newer automobiles, this would have to be performed by a professional, which is inconvenient and adds significant cost. Modification can also reduce the value of the vehicle.

Therefore, a need exists to overcome the problems with the prior art as discussed above.

SUMMARY OF THE INVENTION

The invention provides an assembly and method for preventing wireless communication while driving that overcomes the hereinafore-mentioned disadvantages of the heretofore-known devices and methods of this general type and that quickly and easily installs within a vehicle without the need for physical alteration of any portion of the vehicle or special wiring. Once installed, the device cannot be easily removed by the user, which forces him or her to refrain from engaging in dangerous mobile communication while the car is in motion.

With the foregoing and other objects in view, there is provided, in accordance with the invention, a mobile-communication signal jamming assembly having a first portion shaped to fit within a power port, e.g., cigarette lighter port, of a vehicle and a second portion that at least partially extends from the power port. The assembly includes at least one engagement member that has a retracted position and an extended position that extends outwardly from the first portion and places the engagement member in a coupling arrangement with a portion of the power port of the vehicle. The coupling arrangement can be the engagement member extending within a hole in the sleeve of the power port or frictionally engaging the sleeve. The assembly also includes a locking mechanism operable to selectively move the at least one engagement member from the retracted position to the extended position and a transmitter coupled to at least one of the first portion and the second portion, the transmitter operable to broadcast radio frequency signals that interfere with at least one of a wireless transmission mode and a wireless reception mode of a mobile communication device proximate to the mobile-communication signal-jamming assembly.

In accordance with another feature, an embodiment of the present invention includes an accelerometer communicatively coupled to the transmitter and operable to detect motion of the vehicle.

In accordance with an additional feature, an embodiment of the present invention includes a processor communicatively coupled to the accelerometer and the transmitter and operable to alter a state of the transmitter based on a signal received from the accelerometer.

In accordance with one more feature, an embodiment of the present invention includes a timer communicatively coupled to the processor, wherein the processor measures a predefined amount of time after receiving a no-motion signal—a signal that indicates that the vehicle is not moving—from the accelerometer and before altering the state of the transmitter.

In accordance with a further feature of the present invention, the engagement member is a pivotable arm.

In accordance with a further feature of the present invention, the engagement member is an expandable coupler.

In accordance with yet another feature, an embodiment of the present invention includes an indicator at the second portion that visually and/or audibly indicates that the mobile-communication signal-jamming assembly has been tampered with.

In accordance with an additional feature, an embodiment of the present invention includes a detector that is coupled to the indicator, where the detector is operable to detect a force applied to the mobile-communication signal-jamming assembly in a direction away from the power port.

In accordance with a further feature, an embodiment of the present invention includes a detector that is coupled to the indicator, where the detector is operable to detect a variation of a predefined standing wave ratio at the transmitter.

In accordance with one more feature, an embodiment of the present invention includes an emergency shut-off switch operable to disable the transmitter and an indicator that visually and/or audibly indicates that the emergency shut-off switch has been activated.

In accordance with the present invention, a method of preventing wireless communication while a vehicle is in motion includes the steps of manipulating the locking mechanism to a first position where the at least one engagement member is in the retracted position, inserting the first portion within the power port, and manipulating the locking mechanism to a second position where the at least one engagement member is in the extended position and in a mating relationship with the portion of the power port.

In accordance with another feature, an embodiment of the present invention also includes a GPS transceiver.

Although the invention is illustrated and described herein as embodied in an assembly and method for preventing wireless communication while driving, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the inventive jamming device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
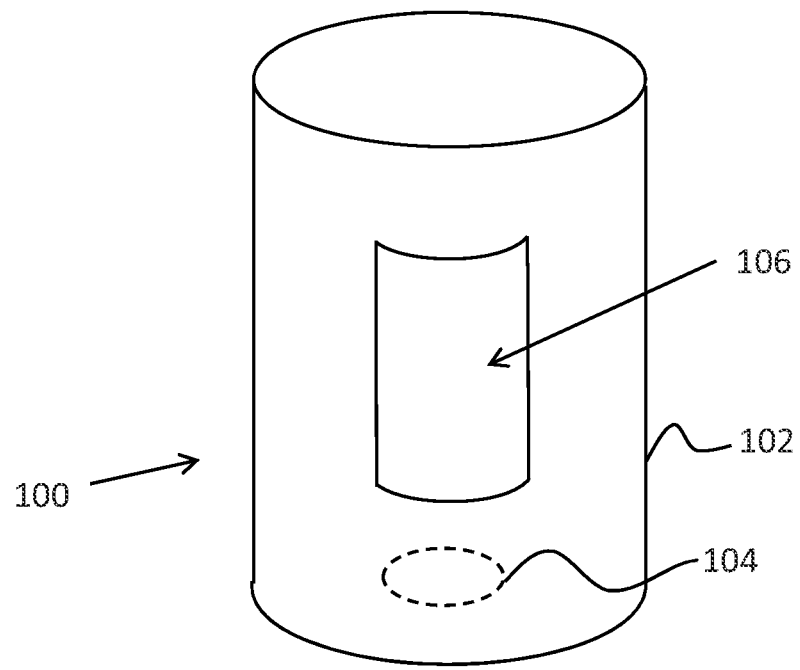
FIG. 1 is a perspective view of a prior art power sleeve found within standard automobiles.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel short-range mobile communication jamming device for use in a vehicle. The device, by preventing the driver from accomplishing distracting communication tasks on the mobile communication device, provides safety to the driver, the passengers, and those in the vicinity while the vehicle is operating. Embodiments of the invention provide an electronic mobile communication signal jamming device that is easily physically attached and secured within the passenger area of a vehicle. Once secured, the device prevents its removal by an occupant that does not having permission to do so. In addition, embodiments of the invention provide various safety features that allow communication once the vehicle is either stopped or while moving and an emergency situation requires jamming to cease.

The accompanying figures show several advantageous features of the present invention, but, as will be described below, are in no way narrowing, as the invention can be provided in several shapes, sizes, combinations of features and components, and varying numbers and functions of the components.

Virtually all automobiles are provided with a 12 V power port, which has traditionally been used for powering cigarette lighters. Today, these power ports are used for powering electronic devices at least as often as they are used to power cigarette lighters. In addition, most new cars are provided with a plurality of 12 V power ports within their interior. One example of a 12 V power port 100 is shown in FIG. 1. The 12 V power port 100 includes a conductive sleeve 102. At the bottom of the conductive sleeve 102, centered, and not in electrical contact with the sleeve 102 is an electrical contact 104. The power port 100 is powered by the automobile so that a DC electrical potential of 12 V appears between the electrical contact 104 and the sleeve 102, which is usually grounded.

Figure 2:
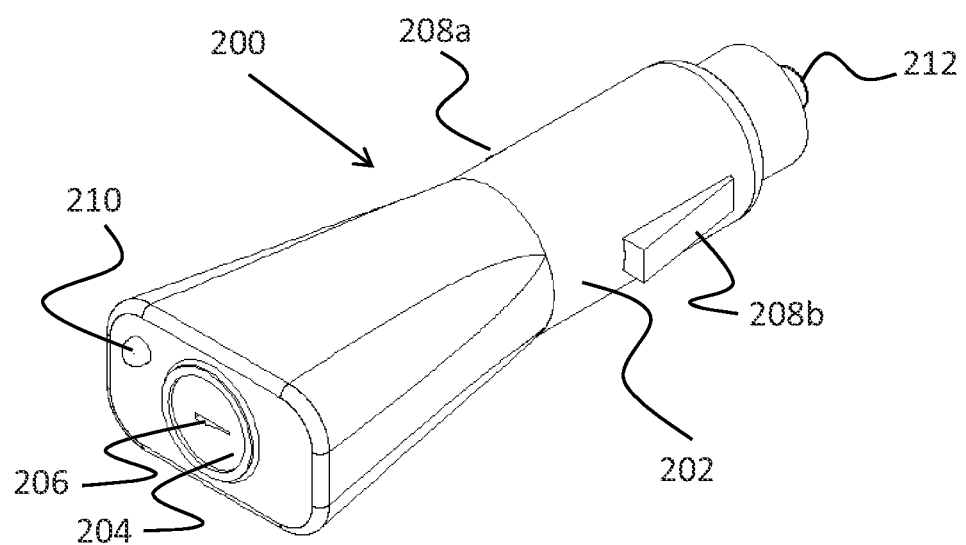
FIG. 2 is a perspective view of the signal jamming device in a locked and activated position with its securing flanges extended in accordance with the present invention.

FIG. 2 shows a first embodiment 200 of the present invention, which includes a body 202 that houses short-range mobile communication jamming circuitry. The ability to jam mobile communication devices has long been known in the art. Therefore, the specific circuitry for accomplishing short range signal jamming is not disclosed in any significant detail herein. However, the present invention is intended to include any jamming circuitry and technique(s) that can prevent at least some communication with a mobile communication device, such as a cellular telephone. This includes Wi-Fi jamming and is not limited to cellular phones or cellular connectivity. For instance, certain devices, such as laptop computers and IPADS®, exclusively use Wi-Fi or other "connectivity" means.

Figure 4:
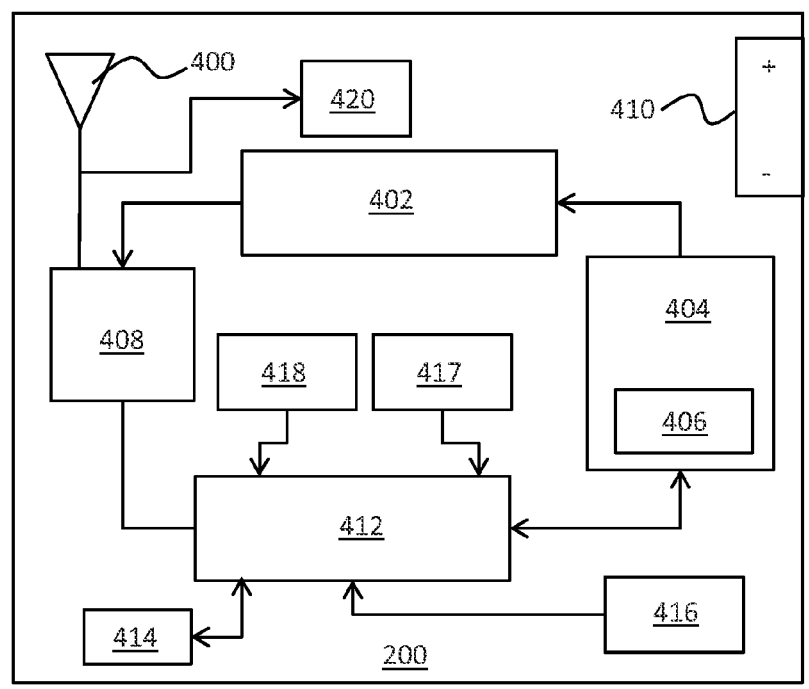
FIG. 4 is a block schematic view of the signal jamming device in accordance with the present invention.

FIG. 4 provides a representative schematic diagram of one exemplary embodiment of a mobile communication jammer 200. The jammer 200 includes an antenna 400, which can be internal or external to the body 202 and may be tuned for individual frequencies. The antenna 400 can be selected to broadcast in a linear or circular polarization so that maximum interference occurs in the vicinity of the driver's seat. A voltage-controlled oscillator ("VCO") 402 generates the radio signal that will interfere with the cell phone signal. A tuning circuit 404 controls the frequency at which the jammer broadcasts its signal by sending a particular voltage to the VCO 402. The tuning circuit 404 includes a noise generator 406 that produces random electronic output in a specified frequency range to jam the cell-phone network signal. The jammer 200 also includes an RF amplifier 408 that boosts the power of the radio frequency output to high enough levels to jam a signal. Additionally, the jammer 200 includes a power supply 410 which, in the present invention, is provided by the automobile in which it is installed. Furthermore, the inventive jammer 200 can be provided with a processor 412, which is useful for executing instructions provided on computer readable media, coordinating operation of the various hardware elements, receiving instructions, reading and writing to a memory 414, and much more.

The term "short-range," as used herein, is intended to indicate a range of between about one foot to about six feet. Other ranges, however, are not excluded from this term. Like cell phones, operation of a jammer at low enough power output, e.g., <1 W, is low enough to avoid causing interference with adjacent devices, e.g., a pacemaker. The broadcast (jamming) range of the jamming device 200 can be adjustable with, for example, and attenuator, to assure the jamming "bubble" is only for the vehicle driver. A display, such as an LED power indicator, can indicate the attenuation setting, e.g., 0, −10, −20 dB. Because the jamming device 200 will broadcast less power than a typical cellular phone, the inventive jamming device 200 will not project radiation at humans at any harmful levels.

Referring back to FIGS. 1 & 2, once the body 202 is fully inserted within the power port 100, a first portion 212 of the device 200 will be in contact with the electrical contact 104 of the power port 100 and a second portion 208a-b of the device 200 will be in contact with the sleeve 102 of the power port 100. Because the jamming device 200 is in electrical contact with both the electrical contact 104 and sleeve 102 of the power port 100 when the jammer 200 is within the power port 100, when the automobile applies power to the power port 100, the power supply 410 is energized and the jamming device 200 will have available to it 12 VDC, but can operate on other voltage levels, such as 5V or 3.3V, to name just a few specific examples.

The exterior of the body 202 supports a locking mechanism 204. As shown in FIG. 2, the locking mechanism 204 has a key hole 206 and is a typical lock device that accepts a key. Of course, this particular type of lock is merely exemplary and the invention is in no way limited to a single type of locking device or key. Extending from the body 202 are a pair of flanges 208a and 208b. The flanges 208a and 208b are physically coupled to the locking mechanism 204 and are activated by the locking mechanism 204. The physical coupling can be accomplished through a simple connecting rod, threaded movements, or any other mechanical connection between the moving locking mechanism 204 and the retractable flanges 208a and 208b. This activation is shown in a comparison between FIG. 2 and FIG. 3. In FIG. 2, the key hole 206 of the locking mechanism 204 is in a first position. In this position, the flanges 208a and 208b extend from a body 202. When inserted within the sleeve 102, and the keyhole 206 is rotated into the position shown in FIG. 2, the flanges 208a and 208b will lockingly engage with the openings 106 in the sleeve 102. Once the flanges 208a and 208b are extended and engage with the openings 106 in the sleeve 102, removal of the jamming device 200 cannot be accomplished without damaging either the sleeve 102 or the jamming device 200. In some vehicles, the sleeve 102 is not provided with openings 106. For these vehicles, the outermost extending tips of the flanges 208a and 208b can feature relatively sharp edges or points that will "dig in" to the inside surface of the sleeve 102.

Figure 3:
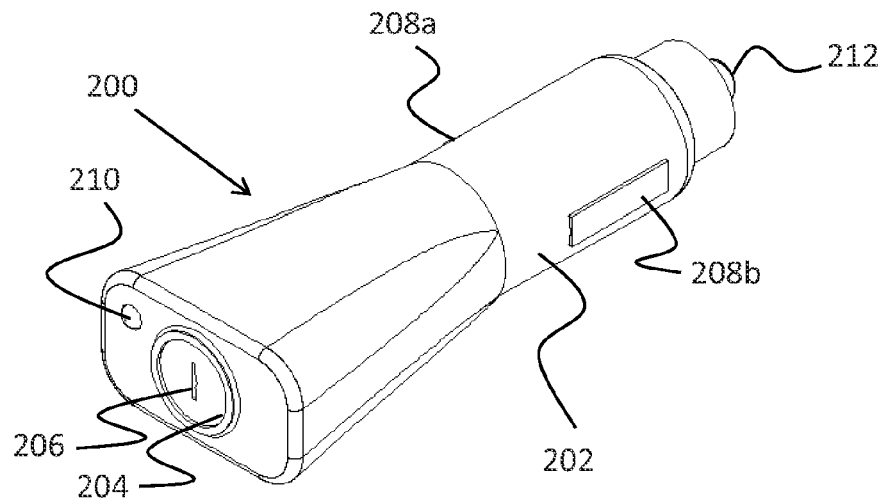
FIG. 3 is a perspective view of the signal jamming device of FIG. 1 in a deactivated position with its securing flanges retracted.

Referring to FIG. 3, it can be seen that the keyhole 206 has been rotated to a second position. Rotating the keyhole 206 to this position causes the flanges 208a and 208b to retract into or toward the body 202. Once the flanges 208a and 208b are retracted, insertion or removal of the jamming device 200 within the sleeve 102 is a simple task. That is, because the flanges 208a and 208b do not extend from the body 202, they do not engage with or interfere with parts of the sleeve, namely the opening(s) 106. In some embodiments of the present invention, in addition to the flanges 208a and 208b, the body 202 of the jammer 200 features a pair of tensioned conductive members that extend from the body 202 and serve as electrical contacts for electrically coupling the jammer 200 to the inside surface of the sleeve 102.

If access to a key that matches the keyhole 206 is restricted to certain persons, those persons having access can install the inventive device 200 within an interior of a vehicle so that its occupants, or more specifically, the driver, cannot remove the device until they gain access to the key. For example, a parent of a young person learning to drive can install the inventive jamming device 200 within that young person's vehicle or any other vehicle which a young person is operating. Of course, the present invention is useful for any driver and is not limited to only young drivers. Advantageously, installation of the jamming device 200 requires no special wiring or access to any electrical components of the automobile. Installation of the device can help ensure the parent that a young person will not be distracted while driving due to ongoing communication, e.g., texting, talking, surfing the Internet, etc. Installation of the device also provides safety to those around a driver who might otherwise be susceptible to distraction from mobile devices.

Advantageously, the device readily allows mobile communication in cases where it is necessary. More specifically, once the key for the vehicle is rotated to the off position, the power port 100 within the vehicle will no longer receive power and the jammer 200 will no longer operate to prevent communication. Therefore, if the driver must make a phone call or transmit a message, all they need to do is turn the automobile off. The automobile will immediately cease supplying power to the power port 100, which will cause the jammer 200 to, in turn, cease operation due to its own loss of power. If a voltage is still present after ignition is off, the present invention will power down during periods when the vehicle is stationary. Although the automobile could be turned off, for instance, at a stoplight, if necessary, it is envisioned that the driver is likely to simply and safely pull over to the side of the road or to any other safe location and turn the vehicle off.

In a further embodiment of the present invention, the inventive jammer 200 is provided with an override button. One such button 210 is shown in FIG. 2. The override button 210, once pushed, disables the jamming function of the device 200 either temporarily or until the key is used to reset the jamming device 200. The override button 210 is useful in cases where the operator of the vehicle requires operation of their mobile device and is not able to or it is inconvenient to turn the automobile off. Advantageously, embodiments of the present invention can cause the override button 210 to indicate that it has been activated. For example, the override button 210 or other portion of the jamming device 200 can feature an LED that glows red once the override button 210 has been pushed. The LED can remain lit until the keyhole 206 is rotated by a key. In this way, if an operator of the vehicle disables the inventive jammer 200, the installer, e.g., the operator's parents, will be informed of this disabling of the device 200 and can take appropriate action with the operator. Advantageously, operation of a mobile device is always available, if necessary, during operation of the vehicle. However, the user's use of the device is limited to situations where the use is absolutely necessary or at a time when the vehicle is stationary.

In accordance with another embodiment of the present invention, the jamming device 200 is provided with a voltage standing wave ratio (VSWR) indicator 420 (shown in FIG. 4) that detects and reports significant changes in the transmission attenuation of the jammer device 200. In telecommunications, standing wave ratio (SWR) is the ratio of the amplitude of a partial standing wave at an antinode (maximum) to the amplitude at an adjacent node (minimum), in an electrical transmission line. The SWR is usually defined as a voltage ratio called the VSWR, for voltage standing wave ratio. For example, the VSWR value 1.2:1 denotes a maximum standing wave amplitude that is 1.2 times greater than the minimum standing wave value. It is also possible to define the SWR in terms of current, resulting in the ISWR, which has the same numerical value. The power standing wave ratio (PSWR) is defined as the square of the VSWR. A SWR is used as an efficiency measure for transmission lines that conduct and connect radio frequency signals to their antennas.

The VSWR indicator 420 can detect and report to the installer a tampering event, such as the driver of the vehicle covering the jamming device 200 with RF shielding, such as aluminum foil, a metal box, and/or metal wire, for example. When the jamming device 200 is covered all or partially with a metal shield, the antenna 400 will "feel" an artificial ground and its effective impedance will change to no longer match the impedance of the feedline, which was designed to operate with an antenna radiating in free space. When the antenna 400 and its feedline do not have matching impedances, some of the electrical energy cannot be transferred from the feedline to the antenna. Energy not transferred to the antenna is reflected back towards the transmitter and detected by the VSWR indicator 420, which then lights a light, shows a display message, or otherwise communicates the tampering event to the installer.

In addition, one embodiment of the present invention utilizes an accelerometer 418, shown in FIG. 4, to detect motion of the device 200, which, when installed in a vehicle, indicates that the automobile is moving. As long as the accelerometer 418 detects motion, the device 200 emits a jamming signal, thereby preventing the driver from communicating. Once the automobile has stopped, the accelerometer 418 will no longer detect motion and the jammer 200 can cease broadcasting jamming signals. This embodiment is also useful for vehicles with power ports that remain powered even after the vehicle has been turned off.

In one embodiment, the device 200 is provided with a timer or clock 416, which is shown in FIG. 4. The timer 416 can be used in conjunction with the accelerometer to prevent the device 200 from operating until the vehicle has been stopped for a predetermined amount of time. This prevents the driver from being able to send and/or receive text messages or other communications at each stop light and then read them in between stops. The timer 416 can be set for, for example, 4 minutes, which exceeds all regularly-encountered city stoplight cycle times. This timer can be included in a processor-based integration circuit or within a microprocessor.

Figure 5:
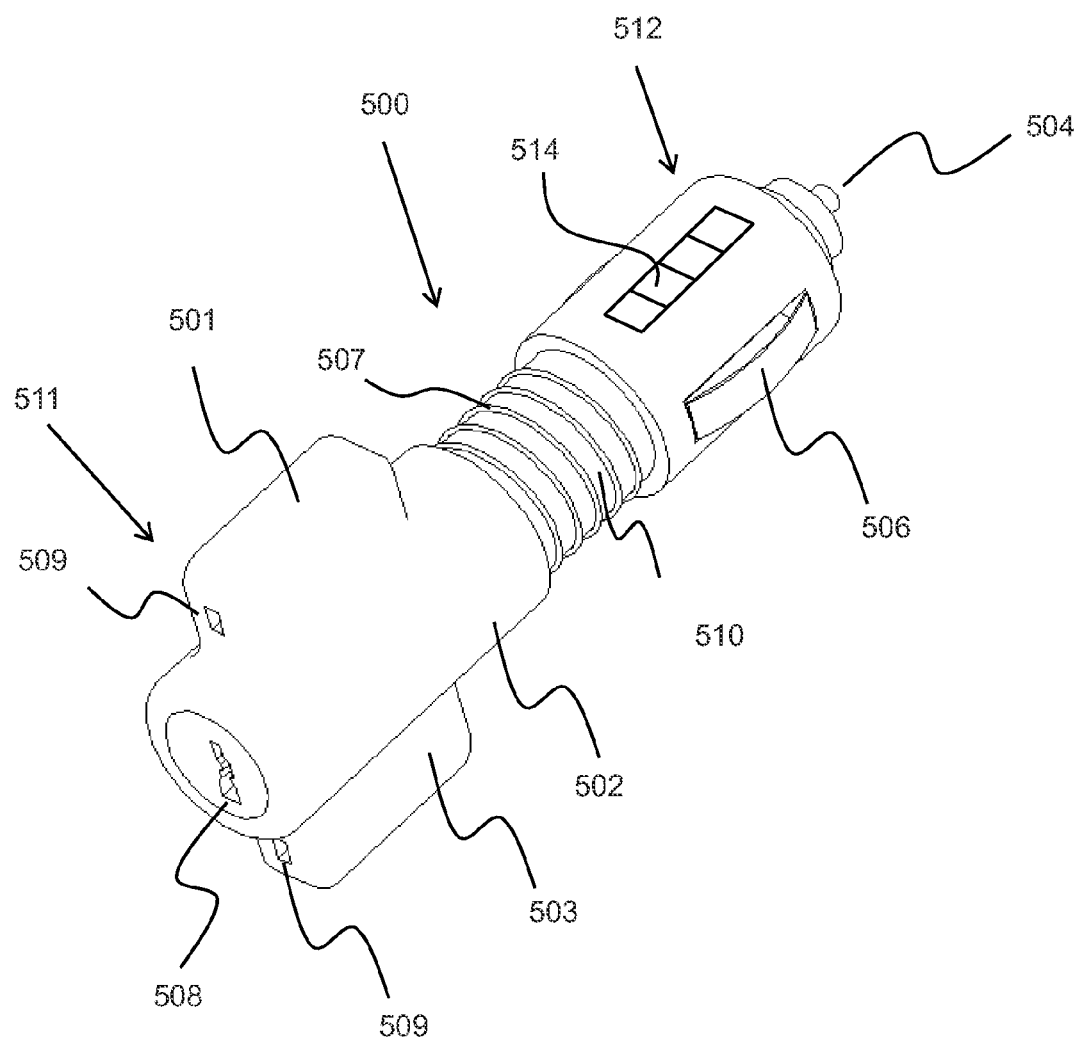
FIG. 5 is a perspective view of a signal jamming device having an expandable securing midsection in accordance with the present invention.

Referring now to FIG. 5, an additional embodiment of the present invention is shown in a perspective view. The embodiment of the signal jamming device 500 includes an elongated body 502 that houses the electronics, e.g., those shown in FIG. 4, to perform signal jamming of a mobile device. The elongated body 502 of the signal jammer 500 also features a pair of ear-like extensions 501, 503. The ear-like extensions 501, 503 can be useful for housing the antenna 400, or portions thereof. As will be explained below, the ear-like extensions 501, 503 are also useful for gripping by a user's fingers. The signal jamming device 500 also includes a power connector 504 at its distal end, spring-loaded grounding contacts 506, indicator lights 509 that can be used to indicate an override of the device, as explained above, and a keyhole 508 at its proximal end.

As with the embodiment of the signal jamming device 200 shown in FIG. 2, the signal jamming device 500 of FIG. 5 is also intended to be inserted within a power sleeve of a vehicle and selectively secured within the sleeve. Securing within the sleeve is accomplished with the embodiment of FIG. 5 through a coupler 510 near the midsection of the elongated body 502. The coupler 510 is analogous to an inverse of a commonly-found plumbing-type coupler. For example, the reverse of the PVC CMP Coupling, by the MUELLAR, Corp., part number #160-106. In this embodiment, a user is able to rotate the proximal end 511 of the elongated body 502 by gripping the ear-like extensions 501, 503 and performing a screw-like movement. During this movement, the distal end 512 of the elongated body 502 remains stationary and the coupler 510 expands in an outward direction. This expansion places pressure, with a rubber gasket or other frictional element 507, on the interior surface of the power sleeve 102 and prevents the signal jamming device 500 from being removed from the sleeve. Once locked by a key in the keyhole 508, rotation of the proximal end 511 is no longer possible.

Alternatively, a non-illustrated key can be used to turn the keyhole 508, which rotates multiple times to move internal components that cause the coupler 510 to expand in an outward direction and place pressure on the interior surface of the power sleeve 102, thus preventing the signal jamming device 500 from being removed from the sleeve.

In alternate embodiments, elements can be caused to move within an interior of the elongated body 502, thus causing portions of the elongated body to expand outwardly and engage with the power sleeve of the vehicle.

Embodiments of the present invention also allow the inventive jammer 200, 500 to be specifically tuned to interrupt only specific frequency ranges. For example, one may wish to interfere with data communication channels but not voice communication channels. Alternatively, one may wish to interfere with data and voice communication channels but not GPS communications. Therefore, referring still to FIG. 5, embodiments of the present invention provide a frequency selector 514 on the distal end 512 of the jammer 500. The frequency selector 514 allows a user to alter the frequencies transmitted by the jammer More specifically, the frequency selector 514 is communicatively coupled to the tuning circuit 404, which thereby controls the frequency at which the jammer broadcasts its signal by sending a particular voltage to the VCO 402. Advantageously, because the frequency selector 514 is on the distal end of the jammer 500, once a frequency has been selected and the jammer has been inserted and secured within the power sleeve of the automobile's interior, the frequency selector 514 is not physically accessible to the driver. Alternatively, the frequency can be determined by connecting the device to a computer through, for instance, a USB cable. In addition, the device can wirelessly receive a frequency selection signal from a controller unit and adjust the frequency values accordingly.

Figure 6:
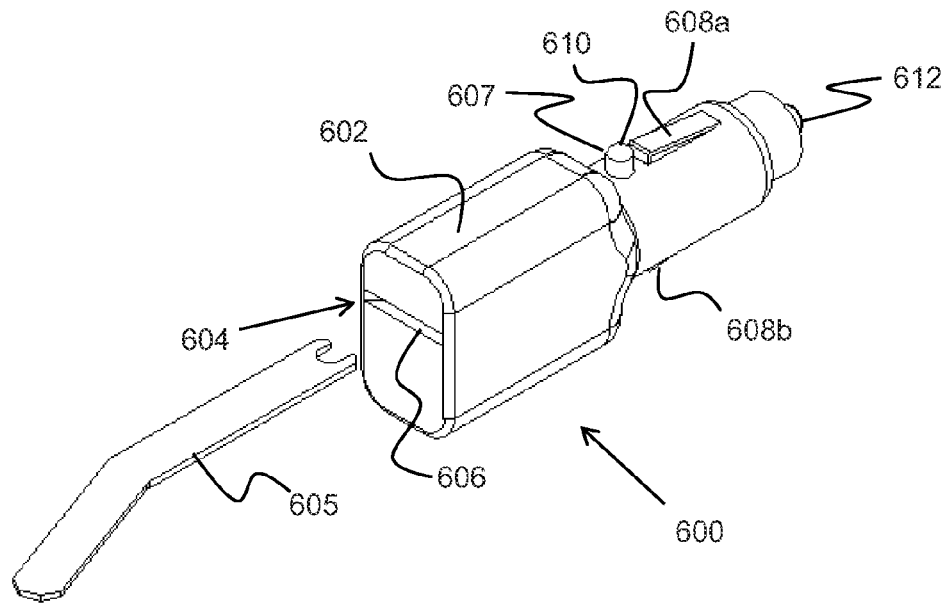
FIGS. 6 & 7 are perspective views of a signal jamming device having an engagement member and a tool for selectively extending/retracting the engagement member in accordance with the present invention.

FIG. 6 shows a jamming device 600 with a body 602 that houses short-range mobile communication jamming circuitry, such as that schematically depicted in FIG. 4. Once the body 602 is fully inserted within a power port 100, a first portion 612 of the device 600 makes contact with the electrical contact 104 of the power port 100 and a second portion 608a-b of the device 600 makes contact with the interior surface of the sleeve 102 of the power port 100.

Figure 7:
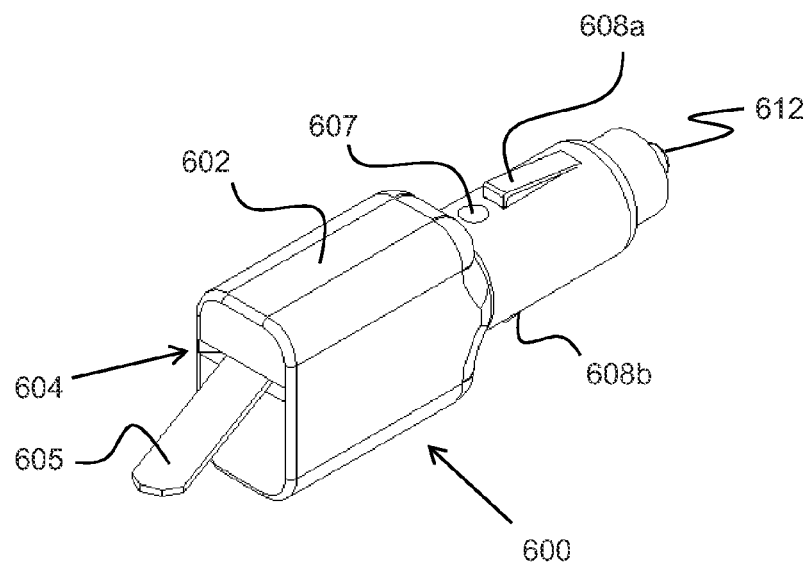

The exterior of the body 602 supports a locking mechanism 604. As shown in FIG. 6, the locking mechanism 604 has an access port 606 that accepts a key tool 605. Of course, this particular type of locking mechanism 604 and key tool 605 is merely exemplary and the invention is in no way limited to the embodiment depicted in the figures. Extending from the body 602 is at least one locking stud 607. The locking stud 607 is physically coupled to the locking mechanism 604 and is activated by the locking mechanism 604, which is, in turn, activated by the key tool 605. The physical coupling can be accomplished through a simple connecting rod, threaded movements, or any other mechanical connection between the moving locking mechanism 604 and the locking stud 607, for example, the arrangement depicted in FIGS. 8 and 9. This activation of the locking stud 607 by the locking mechanism 604 is shown in a comparison between FIG. 6 and FIG. 7. In FIG. 7, the key tool 605 is inserted into the access hole 606 of the locking mechanism 604. Once fully inserted, the key tool 605 causes the locking stud 607 to retract to some degree from its most fully-extended position. Once retracted, the jamming device 600 can easily be inserted or removed from a power port 100 in the same way most cellular phone chargers are inserted/removed.

Looking now to FIG. 6, the key tool 605 is shown removed from the access hole 606 of the locking mechanism 604. Once the key tool 605 is removed, the locking stud 607 extends from the body 602. When inserted within the sleeve 102, the locking stud 607 engages with the opening(s) 106 in the sleeve 102 and prevents removal of the jamming device 600 from the sleeve 102. Once the locking stud 607 is engaged with the opening(s) 106 in the sleeve 102, removal of the jamming device 600 cannot be accomplished without damaging either the sleeve 102 or the jamming device 600. In some vehicles, the sleeve 102 is not provided with openings 106. For these vehicles, the outermost extending tip 610 of the locking stud 607 features a relatively sharp point that will "dig in" to the inside surface of the sleeve 102 and prevent movement of the jamming device 600 relative to the sleeve 102. Other tips may also be used. For example, the tip 610 can be a malleable high-friction material, such as rubber, that will make extraction of the jamming device 600 very difficult without damaging the material or the power port 100.

In other embodiments of the present invention, the locking stud 607 is a movable member with at least two discrete positions. The movable member 607 is in its first position once the jamming device 600 is inserted within a power port 100. Once in place, a removing force, with reference to the sleeve 102, applied to the jamming device 600 moves the movable member 607 to a second position. This second position is one in which the driver of the vehicle cannot alter without a key or key tool and indicates to an observer that the device has been tampered with. Thus, the movable member 607 discourages users of the vehicle from attempting to remove or disable the jamming device 600.

In accordance with another embodiment of the present invention, the movement of the movable member 607 triggers a sound generator, e.g., a speaker, a piezoelectric tone generator, etc., that constantly or periodically audibly signals that the device has been tampered with. Alternatively or additionally, a light the movable member 607 can also trigger a light.

Figure 8:
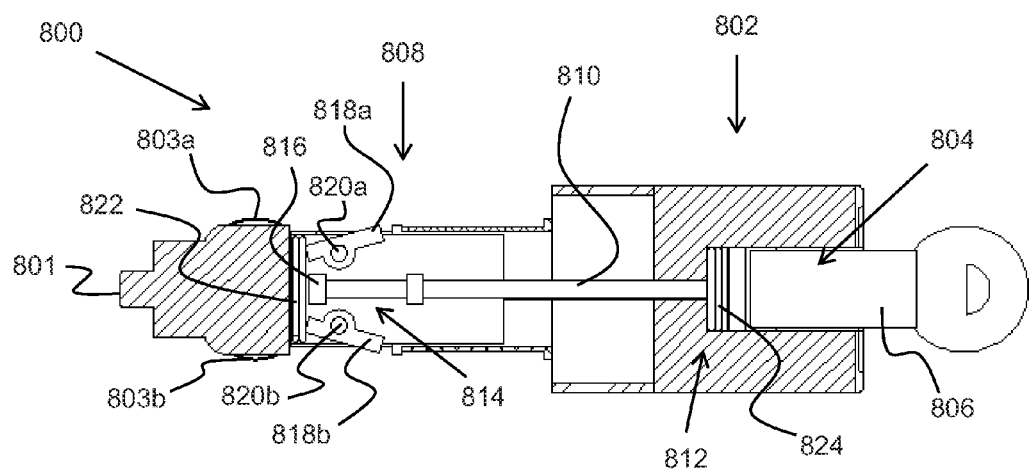
FIGS. 8 & 9 are elevational cross-sectional views of a signal jamming device having opposing engagement members and a tool for selectively extending/retracting the engagement members in accordance with the present invention.
Figure 9:
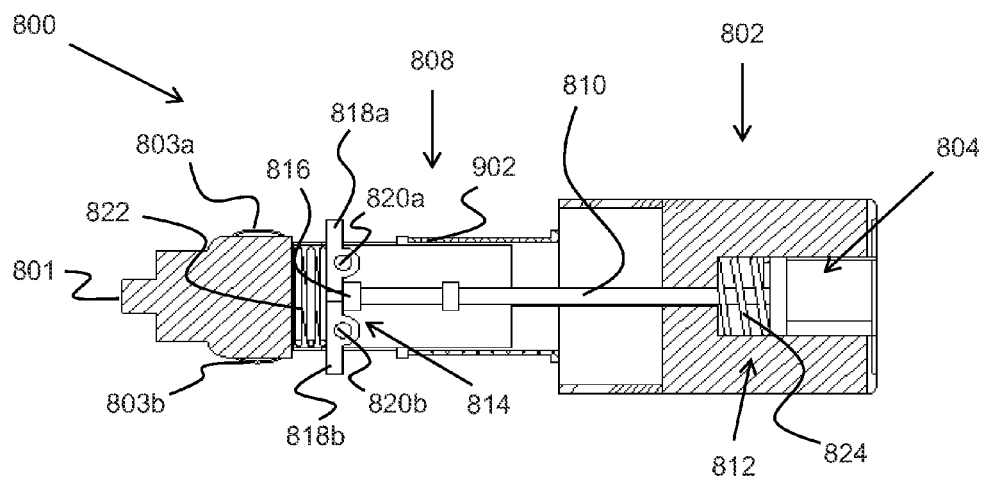

FIGS. 8 and 9 show cross-sectional elevational views of one embodiment of a locking jamming device 800 with engaging members that are selectively retracted/extended through use of a control key in accordance with the present invention. Referring first to FIG. 8, the RF jamming device 800 includes a head portion 802 that houses all or some of the circuitry schematically illustrated in FIG. 4. Coupled to the head portion 802 is a mating portion 808, which is the portion that is inserted within the sleeve 102 of the power port 100 of a vehicle. The mating portion 808 includes a first electrical contact 801 at its distal end and a pair of second electrical contacts 803a and 803b that expand away from the mating portion 808 and make spring biased electrical contact with the interior wall of a power port sleeve 102.

The head portion 802 features a port 804 shaped to accept a limited number of objects, preferably, only a unique key 806, and affects the jamming device's ability to physically engage with the sleeve 102 and prevent removal of the jamming device 800 once it is installed.

A shaft 810 extends from the head portion 802 to the mating portion 808. The key 806, when inserted within the port 804, is able to engage the proximal end 812 of the shaft 810. In this embodiment, the engagement is the application of a lateral force upon the proximal end 812 of the shaft 810 toward the distal end 814 of the shaft 810. At the distal end 814 of the shaft 810 is a plunger 816. The plunger 816 makes physical contact with a set of pivot arms 818a and 818b that pivot upon axes 820a and 820b, respectively. A distal spring 822 exerts a biasing force upon the pivot arms 818a and 818b in a direction toward the proximal end 812 of the shaft 810. A proximal spring 824 exerts a biasing force upon the shaft 810 also in a direction away from the mating portion 808.

When a force is exerted upon the shaft 810 with the key 806, the force being sufficient to overcome the spring biasing force of both the proximal spring 824 and the distal spring 822, the shaft 810 is moved in a distal direction. This distal position is depicted in FIG. 8. Because the shaft 810 moved distally, it caused the arms 818a and 818b to pivot upon their axes 820a and 820b, respectively, and withdraw at least partially into the mating portion 808. While in this position, the mating portion 808 can be easily inserted and withdrawn from a power port 100.

FIG. 9 shows a cross-sectional elevational view of the jamming device 800 with the key 806 removed. Once the key 806 is removed, the jamming device 800 moves to its locked position. More specifically, the biasing force from the proximal spring 824 causes the shaft 810 to slide in a proximal direction toward the head portion 802. As the shaft 810 slides, so too does the plunger 816. When the plunger 816 moves proximally, the biasing force from the distal spring 822 presses against the pivot arms 818a and 818b and causes them to pivot upon their axes 820a and 820b, respectively. Once the pivot arms 818a and 818b pivot upon their axes 820a and 820b, portions of the pivot arms 818a and 818b extend outwardly from the body 902 of the mating portion 808 of the jamming device 800.

Advantageously, if the sleeve 102 of the power port 100 into which the mating portion 808 of the jamming device 800 is inserted does not have openings 106, the pivot arms 818a and 818b will simply remain in or only extend slightly out of the body 902 of the mating portion 808. The distal spring 822 will provide the pivot arms 818a and 818b with a spring bias pushing them against the sleeve surface. Pulling on the head portion 802 of the jamming device 800 will cause the outer edges of the pivot arms 818a and 818b to dig into the sleeve surface and resist removal of the jamming device 800. To properly remove the jamming device 800, the key 806 is simply inserted into the opening 804 and the pivot arms 818a and 818b are rotated back to the position shown in FIG. 8.

Figure 11:
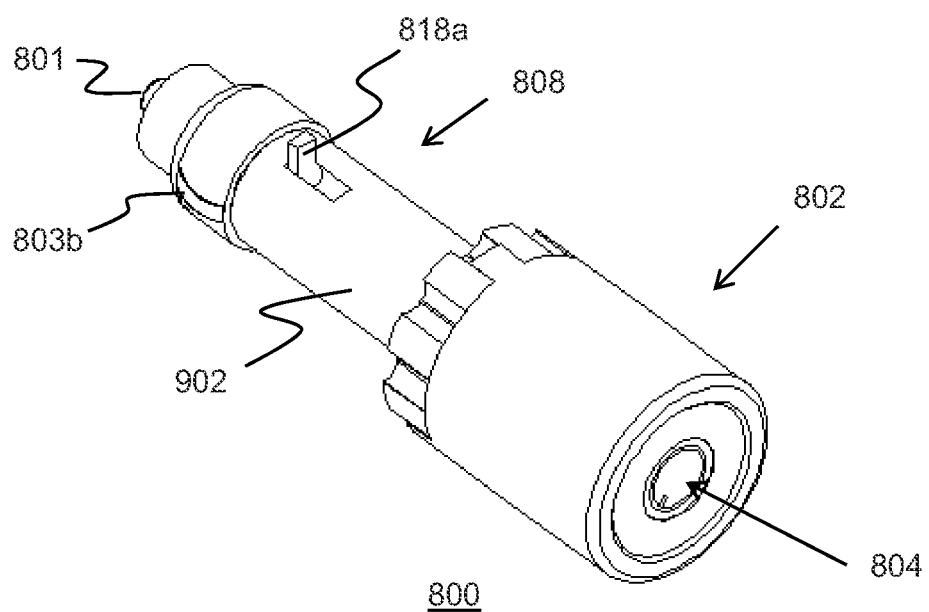
FIG. 11 provides a perspective view of the jamming device depicted in FIGS. 8 and 9.

FIG. 11 provides a perspective view of the jamming device depicted in FIGS. 8 and 9.

In further embodiments of the present invention, the jamming device 200, 500, 600, 800 includes short message service (SMS) transmitting capability. SMS is a text messaging service component of phone, web, or mobile communication systems, using standardized communications protocols that allow the exchange of short text messages between a mobile device, i.e., the jamming device 200, 500, 600, 800, and a fixed line or mobile phone device. The term SMS, as used herein, is intended to be a synonym for all types of short text messaging. With this capability, the installer of the device can be instantly notified of any tampering of the device by the driver or anyone else. In addition, the SMS capability can alert the installer or anyone else of an emergency situation, for example, when the driver presses the emergency disable button 210.

Furthermore, the present invention can be provided with a Global Positioning System (GPS) receiver 417 that provides location information pertaining to the jamming device. The GPS and devices that utilize the GPS are well known to those of skill in the art. It is therefore not necessary to describe the GPS or GPS devices in great detail. The location information obtained through the provided GPS receiver 417 can be stored in the memory 414 and downloaded at a later time. The location information can also be transmitted via the above-described SMS communication or one of many other communication protocols. This transmission can occur when the vehicle stops, in between the jamming duty cycle, or at a frequency that is not being jammed. In addition, the GPS receiver 417 can be used by the device to determine when the vehicle is stationary, i.e., not moving. During periods when the vehicle is not moving, the jamming device can cease its jamming function and allow the operator to utilize his or her phone or other wireless device as desired. However, one the GPS receiver 417 detects movement of the vehicle, jamming transmissions can once again resume.

In yet another embodiment, the target phone being jammed can be provided with software that allows it to respond to a signal from the jamming device, where it ceases communication until a second signal from the jamming device is received. In this embodiment, the jamming device does not have to continuously broadcast the jamming transmission. However, the jamming device can communicate with the mobile device in the same manner described above. For example, when the accelerometer 418 indicates the vehicle is stationary for a preselected amount of time, the jamming device can communicate to the mobile the device and reactivate wireless communication. Once the vehicle moves, the jamming device will signal the mobile device to stop communicating.

Figure 10:
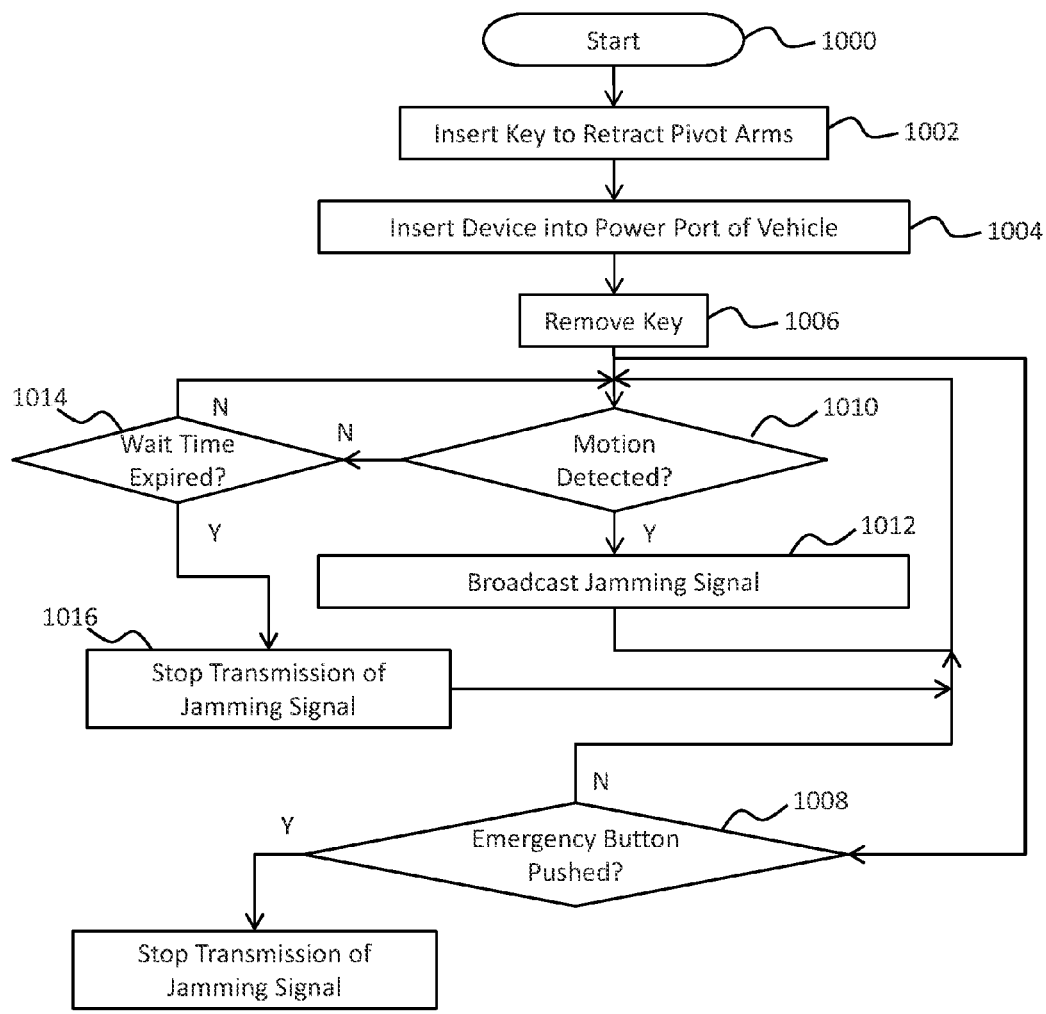
FIG. 10 is a process flow diagram of a method for preventing wireless communication while a vehicle is in motion in accordance with the present invention.

FIG. 10 provides a process flow diagram of one exemplary method of utilizing the present invention. The process begins at step 1000 and move directly to step 1002 where a key is inserted into the jamming device. As was explained directly above, utilizing the key places the jamming device into an insertable physical configuration that easily fits within a power port of a vehicle. In step 1004, the jamming device is placed within the power port of the vehicle. In step 1006, the key is removed from the jamming device. It should be noted that although the term "key" is used herein, the invention is not limited to standard keys, but can also include any tool for activating the device, such as a fingerprint detector.

In step 1010 a determination is made as to whether or not device senses motion. If the answer to the query of step 1010 is yes, the device begins broadcasting the jamming signal that prevents a mobile device from carrying out communication, such as text, data, or voice transmissions and/or receptions. The process then returns to step 1010 to monitor whether or not motion continues to be identified.

If the result of the query in step 1010 is no, i.e., motion is not been sensed, the flow moves to step 1014 where a determination is made as to whether or not the week time has expired. The wait time is in amount of time the must transpire before the device ceases broadcasting of the jamming signal. For example, the wait time might be longer than the average time sitting at a stoplight. If the answer to the query in step 1014 is no, the process moves back to step 1010. However, if the answer to the query in step 1014 is yes, the flow moves to step 1016 were transmission of the jamming signal is stopped. This allows a user of a mobile device within the vehicle in which the jamming device is installed to safely engage in communication. The flow then returns to step 1010 where the device continues to monitor for motion.

In parallel with the above-describe process that takes place after step 1006, the device also continuously carries out step 1008 where a check is made as to whether or not the emergency button has been pushed. Activation of the emergency button moves the process to 1016 were transmission of the jamming signal is stopped. Once the transmission is stopped due to detection of the emergency button being pushed, it no longer matters whether the device detects motion of the vehicle in which the device is installed. Activation of the emergency button instantly allows the user of the mobile device to engage in all communication and is not encumbered by the jamming signals, which have ceased.

In accordance with another embodiment of the present invention, the jamming device 800 is provided with a GPS receiver and is paired with one or more mobile communication devices that also have GPS capabilities. In this embodiment, the jamming device 800 is able to receive and interpret signals identifying the particular mobile communication device's location based on GPS signals transmitted by the device. When a determined distance between the paired mobile communication device(s) and the jamming device 800 is small enough, i.e., the mobile communication device is in the vehicle, the jamming device 800 broadcasts the jamming signal.

A mobile communication jamming-signal device has been disclosed that quickly and easily installs within a vehicle without the need for physical alteration of any portion of the vehicle or special wiring. Once installed, the device cannot be easily removed by the user, which forces him or her to refrain from engaging in dangerous mobile communication while the car is in motion. Several optional features of the present invention allow for easy identification of attempts to disable the inventive device. The device also provides one or more reliable ways of disabling the jamming function, namely, turning the vehicle off and removing the key, pulling over to the side of the road and allowing the vehicle to remain stationary for a predetermined number of minutes, and activation of an emergency button.

What is claimed is:

1. A mobile-communication signal-jamming assembly comprising:
    a first portion shaped to fit within a power port of a vehicle;
    at least one engagement member having:
        a retracted position; and
        an extended position that extends outwardly from the first portion and places the at least one engagement member in a coupling arrangement with a portion of the power port of the vehicle;
    a second portion having a locking mechanism operable to selectively move the at least one engagement member from the retracted position to the extended position; and
    a transmitter coupled to at least one of the first portion and the second portion, the transmitter operable to broadcast radio frequency signals that interfere with at least one of a wireless transmission mode and a wireless reception mode of a mobile communication device proximate to the mobile-communication signal-jamming assembly.

2. The mobile-communication signal-jamming assembly according to claim 1, further comprising:
    an accelerometer communicatively coupled to the transmitter and operable to detect motion of the vehicle.

3. The mobile-communication signal-jamming assembly according to claim 2, further comprising:
    a processor communicatively coupled to the accelerometer and the transmitter and operable to alter a state of the transmitter based on a signal received from the accelerometer.

4. The mobile-communication signal-jamming assembly according to claim 3, further comprising:
    a timer communicatively coupled to the processor, wherein the processor measures a predefined amount of time after receiving a no-motion signal from the accelerometer and before altering the state of the transmitter.

5. The mobile-communication signal-jamming assembly according to claim 1, wherein:
    the engagement member is a pivotable arm.

6. The mobile-communication signal-jamming assembly according to claim 1, wherein:
    the engagement member is an expandable coupler.

7. The mobile-communication signal-jamming assembly according to claim 1, further comprising:
    an indicator at the second portion at least one of visually and audibly indicating that the mobile-communication signal-jamming assembly was tampered with.

8. The mobile-communication signal-jamming assembly according to claim 7, further comprising:
    a detector coupled to the indicator, the detector operable to detect a force applied to the mobile-communication signal-jamming assembly in a direction away from the power port.

9. The mobile-communication signal-jamming assembly according to claim 7, further comprising:
    a detector coupled to the indicator, the detector operable to detect a variation of a predefined standing wave ratio at the transmitter.

10. The mobile-communication signal jamming assembly according to claim 1, further comprising:
    an emergency shut-off switch operable to disable the transmitter; and
    an indicator at least one of visually and audibly indicating that the emergency shut-off switch has been activated.

11. A method of preventing wireless communication while a vehicle is in motion, the method comprising:
    providing a mobile-communication signal-jamming assembly comprising:
        a first portion shaped to fit within a power port of a vehicle;
        at least one engagement member having:
            a retracted position; and
            an extended position that extends outwardly from the first portion and places the at least one engagement member in a coupling arrangement with a portion of the power port of the vehicle;
        a second portion having a locking mechanism operable to selectively move the at least one engagement member from the retracted position to the extended position; and
        a transmitter coupled to at least one of the first portion and the second portion, the transmitter operable to broadcast radio frequency signals that interfere with at least one of a wireless transmission mode and a wireless reception mode of a mobile communication device proximate to the mobile-communication signal-jamming assembly;

manipulating the locking mechanism to a first position where the at least one engagement member is in the retracted position;
inserting the first portion within the power port; and
manipulating the locking mechanism to a second position where the at least one engagement member is in the extended position and in a mating relationship with the portion of the power port.

12. The method according to claim 11, further comprising:
detecting an absence of motion of the vehicle; and
ceasing transmission operations of the transmitter when the absence of motion of the vehicle is detected.

13. The method according to claim 12, further comprising:
waiting a predefined amount of time after detecting the absence of motion of the vehicle before ceasing transmission operations of the transmitter.

14. The method according to claim 11, wherein:
the engagement member is a pivotable arm.

15. The method according to claim 11, wherein:
the engagement member is an expandable coupler.

16. The method according to claim 11, further comprising:
sensing a removing force applied to the mobile-communication signal-jamming assembly; and
activating a tampering indicator on the mobile-communication signal-jamming assembly.

* * * * *